United States Patent [19]

Titz

[11] 4,120,926

[45] Oct. 17, 1978

[54] PROCESS FOR REDUCING THE SHRINKAGE OF EXTRUDED PROFILED ELEMENTS OF THERMOPLASTIC SYNTHETIC RESINS

[75] Inventor: Siegfried Titz, Wissen, Germany

[73] Assignee: Dynamit Nobel Aktiengesellschaft, Germany

[21] Appl. No.: 654,726

[22] Filed: Feb. 2, 1976

[30] Foreign Application Priority Data

Feb. 1, 1975 [DE] Fed. Rep. of Germany ....... 2504190

[51] Int. Cl.² .............................................. B29D 9/20
[52] U.S. Cl. ...................................... 264/89; 264/90; 264/176 R; 264/177 R; 264/209; 264/237; 264/348
[58] Field of Search ................. 264/90, 94, 95, 176 R, 264/89, 177 R, 150, 209, 210 R, 237, 348; 425/326 R, 378

[56] References Cited

U.S. PATENT DOCUMENTS

| 3,169,272 | 2/1965 | Maxson | 264/95 |
| 3,296,661 | 1/1967 | DeMoustier | 425/326 R |
| 3,507,939 | 4/1970 | Williams et al. | 264/176 R |
| 3,668,288 | 6/1972 | Takahashi | 264/237 |
| 3,804,567 | 4/1974 | Recknagel | 425/378 |
| 3,812,230 | 5/1974 | Takahashi | 264/209 |
| 3,851,028 | 11/1974 | Beyer | 264/177 R |
| 3,922,328 | 11/1975 | Johnson | 264/178 R |

Primary Examiner—Jeffery R. Thurlow
Attorney, Agent, or Firm—Craig & Antonelli

[57] ABSTRACT

A process for reducing the shrinkage of profiled elements of thermoplastic synthetic resins, which normally occurs due to undesired stresses frozen in during extrusion in an extruder die and calibration in a calibrating device, involves the step of maintaining the extrusion speed of the profiled element upon exiting from the extruder die at least the same or almost the same as the calibrating speed and/or take-off speed of the profiled element during its subsequent passage through the calibrating device. Also, it is advantageous to cool selected and defined portions of the periphery of the extrudate during the initial stage of calibration within the calibrating device so that a reinforced frame or corset is formed within the extrudate.

3 Claims, 4 Drawing Figures

FIG.1
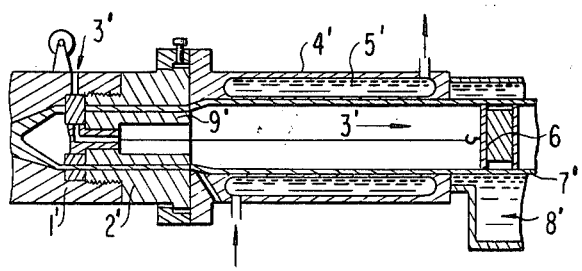
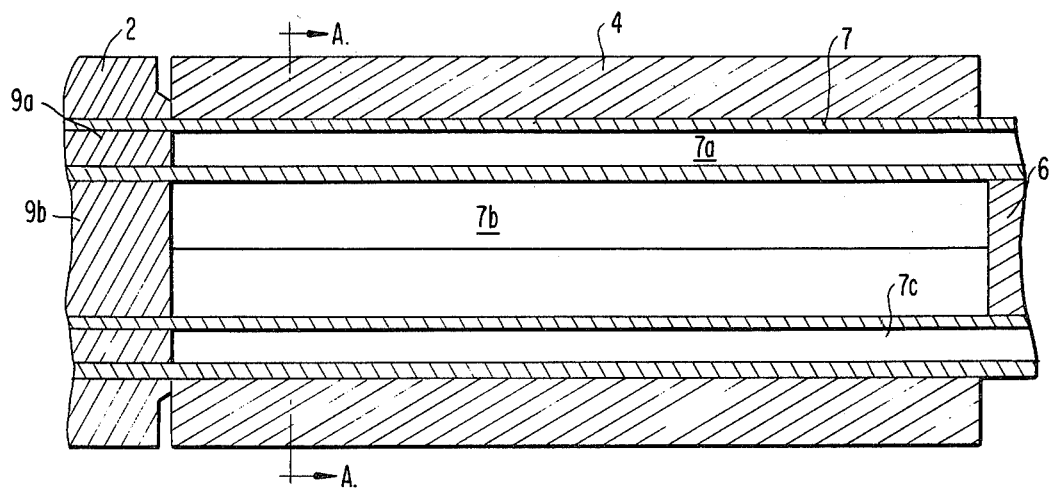
FIG.2

PROCESS FOR REDUCING THE SHRINKAGE OF EXTRUDED PROFILED ELEMENTS OF THERMOPLASTIC SYNTHETIC RESINS

The present invention relates to a process and apparatus for reducing the shrinkage of profiled elements, e.g. hollow tubes, rods, bars and the like made of thermoplastic synthetic resins, which shrinkage is produced by undesired frozen-in stresses during extrusion and calibration or sizing.

In the conventional modes of operation, the profiles, e.g. hollow profiles, such as tubes, are manufactured by extrusion so that the cross section of the extruded profile is larger than the dimension of the finished article. The exiting profile, still in the plastic state, is therefore guided subsequently through a gauge or calibrating device where, for example by internal excess pressure or external vacuum in the gauge or calibrating device, the entire profiled member is stretched, thus enforcing thereon the desired final dimension of the finished article. In the drawings, FIG. 1 shows such a conventional extrusion apparatus for pipe manufacture with a combined centering and calibration system, in a schematic representation. The extruded pipe 7' of a thermoplastic synthetic resin leaves the extruder 1' through the die 2' and passes directly into the calibrating device with indirect internal cooling means 5'. Supporting air 3' is blown through the hollow interior of the pipe, so that, due to the internal excess pressure, the pipe is in contact, with its outer surface, with the calibrating device. During this procedure, the pipe is widened or enlarged and then taken off by means of a subsequent take-off device, not shown. At the end of the calibrating device, the floating plug 6 is arranged in the interior of the pipe to seal off the supporting air; the calibrating device 4' is followed by a final cooling bath 8'. The pipe exiting from the die 2', the cross section of which is determined by the gap width between the die 2' and the mandrel 9', does not conform to the final, finished dimensions of the pipe; such dimensions are only produced by the calibrating device. It is customary to extrude such profiles of thermoplastic synthetic resins with a larger cross section, e.g. a thicker wall for a hollow member, than corresponds to the dimension of the finished article, because the widening of the extrudate occurring after the extrudate has left the die and, being dependent on the extrusion conditions and the material, also counteracts a dimensionally accurate extrusion.

However, any subsequent stretching of the extruded profile or member in a calibrating tool means that there does not exist a stress-free condition during the cooling-off phase, and undesired stresses produced by the stretching step are frozen in, or retained, which are later on liberated during the reheating of the profiles and thus allow the profiles to shrink. This residual shrinkage is the higher, the greater the stretching during the calibrating step.

To keep the shrinkage of extruded profiles of thermoplastic synthetic resins at a minimum, the problem must be solved to leave the profiled extrudate in a maximally stress-free or low-stress condition during the cooling and calibrating phase. This means that the extruded profiled member or element is to be stretched as little as possible in the transition range from the thermoplastic to the thermoelastic phase and in the thermoelastic condition.

The process of this invention for reducing the shrinkage in connection with extruded profiles of thermoplastic synthetic resins maintains the extrusion speed of the profiled element, when exiting from the extruder die, equal or almost equal to the calibrating speed and/or take-off speed of the profiled element during the subsequent passage through the calibrating tool. Also, at the same time the cross section of the extrudate when exiting from the extruder die corresponds entirely or almost, with respect to its dimensions, to the finished dimensions, taking into account the widening of the extrudate when exiting from the extruder die. In this manner, it is possible to lower the stretching of the profiled extrudate to the final dimensioning of the element within the calibrating tool to an uncritical amount, so that an almost stress-free condition is obtained during the cooling phase in the calibrating tool.

Since the dimensions of the extruder die, to be determined empirically, do not permit a one-hundred percent conformance to the final dimensions of the extruded element and also because of the widening of the profiled extrudate after exiting from the die, (which is dependent particularly on the extrusion conditions and on the compositions of the thermoplastic material to be processed) a certain stretching of the profiled extrudate during the subsequent calibrating step is not entirely avoidable.

A basic object of this invention, namely to minimize the shrinkage of the profiled element is thus attained according to this invention in additional process steps in that the profiled extrudate is, in the initial phase of the calibrating step, cooled to a greater extent at defined locations distributed over the periphery of the extrudate, than at the remaining locations of the periphery. By means of the treatment according to this invention, the still hot profiled extrudate fed into the calibrating device is provided, by the preceding cooling at defined locations of the profiled extrudate, with a reinforcing corset, or frame of stiffened sections, at these locations, which is capable of absorbing tensile forces, so that the frictional resistance of the wall of the calibrating device along the profiled extrudate cannot effect a lengthening and/or stretching of the extrudate during the drawing of the extrudate through the calibrating device.

The cooling technique according to this invention, which has a favorable effect on the shrinking of the profiles, is based on the following considerations: The cooling of the profiled extrudate takes place at defined locations of the extrudate very early in the inlet zone of the calibrating device, for example by direct contact of the profiled extrudate at these locations with the cooling medium in an intensive manner. Thereby, a corset, i.e. a stiffened frame, is formed on the profiled extrudate in the transition zone of the cooling process from the thermoplastic phases to thermoelastic phase and in the thermoelastic phase; forces can be absorbed at the corset reinforcing points or sections without the occurrence of any stretching of the remaining profile sections during the drawing-through of the profiled extrudate and during the cooling phase in the calibrating device, for example due to an excessive frictional contact of the profiled extrudate with the calibrating surfaces of the wall of the calibrating device. Accordingly, however, only minor stresses are frozen into or retained within the profiled extrudate, and the shrinkage of the finished profiled extrudate is thereby considerably lowered.

The process of this invention can be executed, for example, by cooling the periphery of extruded profile externally in the inlet or initial phase of the calibration step, partly indirectly and partly directly with a cooling medium, e.g. cooling water. In this way, the early cooling of certain zones of the profile, distributed over the periphery, can be attained.

The apparatus for conducting the process of this invention includes an extruder die and a calibrating tool which operate with an internal excess pressure and/or an external vacuum and which is optionally cooled. The extruder die must be fashioned, in accordance with the invention, so that the exit cross section of the die is so dimensioned that, taking the widening of the profiled extrudate into account, a profiled extrudate, the cross-sectional dimensions of which almost correspond to those of the finished article or element, is extruded. In this manner, it is possible to maintain the exit rate or speed of the extrudate from the extruder die at the same or almost the same value as the calibrating speed, so that a calibration is thus possible with minimum stretching and thus with as little stress as possible. While it has been customary heretofore to dimension thermoplastic extruded profiles by draw-down, wherein in case of rigid thermoplastics it was necessary to add 5-10% for the width and height dimensions, and in case of other thermoplastics to add 20-25% for such dimensions for the extruder die, the heretofore customary dimensions of the die forming the matrix or the extrudate are considerably reduced in the apparatus of this invention. For hard PVC charges, for example, the matrix heights and widths of the extruder die are designed to be smaller by 5% than the finished article dimensions, rather than be larger by 5%, as was customary heretofore, and the gap widths of the matrix are designed to be smaller by more than 25% than the wall thicknesses of the finished article, rather than only be smaller by 10% as heretofore. An extrusion die dimensioned in this way already takes the widening of the extrudate into account, so that a profiled extrudate is formed which, after exiting from the extruder die in a stress-free condition has already almost the cross-sectional dimensions of the finished article.

To conduct the cooling technique of this invention in the calibrating tool or device, it is furthermore recommended to incorporate pockets or cavities at defined locations in the inlet zone on the inside of the calibrating tool, these cavities being in communication with ducts for the feeding and discharging of a cooling medium. It is advantageous to provide the locations of the profiled extrudate to be subjected to an intense and early cooling treatment at the zones of the periphery which, for example, do not form any visible surfaces and/or which do not have to meet any especially high requirements regarding surface quality. As the cooling medium, it is possible, for example, to utilize the coolant employed for the normally customary, indirect cooling of the calibrating tool. In case of a calibrating tool with vacuum calibration, it is possible, for example, to connect the cooling pockets with vacuum slots so that the cooling medium is withdrawn by suction through these slots. The cooling medium, for example water, thus flows from the indirect part of a cooling unit through the connecting ducts into the cooling pockets and there enters into direct contact with the hot extruded profiled member. The removal of the heat is very intensive at these locations due to this cooling treatment, since the heated cooling water is constantly withdrawn through the vacuum slots in the calibrating wall, which are also in communication with the cooling pockets, and new, cold water is constantly fed from the indirect cooling system of the calibrating device. The suction removal of the water through the vacuum slots also has a favorable effect on the indirect cooling of the calibrating device since the heat removal is thereby also increased at this point.

By means of the process steps and apparatus provided by the present invention, it is possible to considerably reduce the shrinkage in extruded profiled products of thermoplastic synthetic resins to which the final dimensions are imparted by a calibrating step. This object is attained, on the one hand, by reducing the stresses occurring by adapting the calibrating rate or speed to the extrusion rate or speed of the profiled extrudate and, on the other hand, by cooling the extrudate in such a way that it can absorb tensile forces at an early point in time to avoid a stretching effect.

The invention is illustrated in the accompanying drawings in one embodiment and is explained in greater detail in the following description with reference thereto; wherein:

FIG. 1 shows a conventional extruder apparatus for a pipe in a longitudinal sectional view;

FIG. 2 shows a fragmentary longitudinal section through an extruder apparatus having a construction according to this invention and its application to the formation of a multiple-chamber hollow profiled element;

Figure 3:
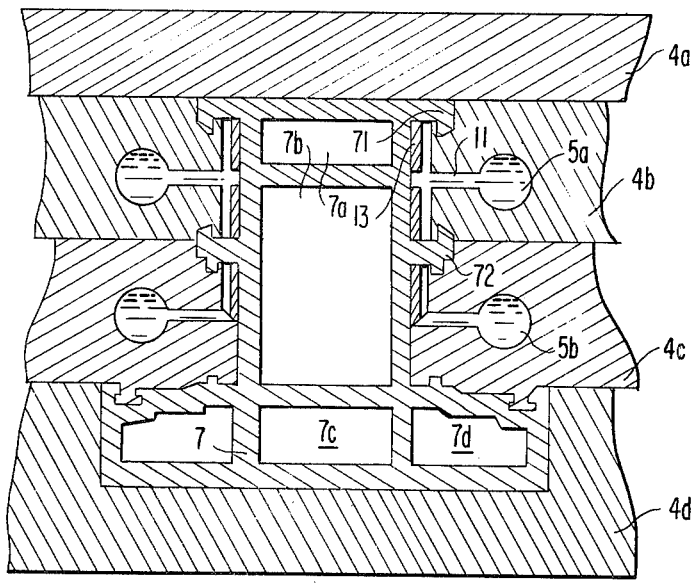
FIG. 3 shows a cross section along line A—A of FIG. 2 through a calibrating device on an enlarged scale.

FIG. 1 illustrates a conventional extruder apparatus, used for example to manufacture a pipe of a thermoplastic synthetic resin. It can be seen that the pipe 7' exiting from the die 2', 9' does not correspond, with respect to its dimensions, to dimensions of the finished article, but rather the pipe in the calibrating device 4' is enlarged in its outer diameter and reduced in its wall thickness, on the one hand by the excess pressure of air 3' and, on the other hand, by the automatically occurring widening of the extrudate. This causes a considerable stretching of the extruded pipe during the cooling phase, whereby stresses are frozen in or retained within the pipe in correspondence with the amount of stretching, which are liberated during subsequent reheating and lead to a considerable shrinkage of the pipe.

The extruder apparatus shown in a fragmentary view in FIG. 2, with a calibrating device, illustrates schematically that in an application of this invention the profiled extrudate 7 exiting from the extruder die 2 with the internal mandrels 9a and 9b already corresponds with respect to its dimensions to the desired dimensions of the finished thermoplastic article. This is attained by designing the extruder die 2, 9 in its matrix heights and widths and in its gap widths so that it already takes into account the dimensional changes of the extruded profiled article, especially also the widening of the extrudate after its exit. These dimensions for the extruder die must be determined empirically, wherein a basic deviation is made from the previous practice of designing the extruder die dimensions larger than the final dimensions of the finished article. In this way, it is possible according to this invention to extrude a profiled extrudate which, upon leaving the extruder die in the stress-free condition, practically has the cross-sectional dimensions of the finished article. Thereby, the further process step essential to this invention becomes simultaneously possible, namely to make the exit speed of the profiled extrudate from the extruder die 2 almost equal to the take-off speed of the extrudate at the desired article dimensions. However, this also achieves the purpose of lowering (during the final, accurate dimensioning of the profiled extrudate 7 in the calibrating tool 4) the stretching of the bar-shaped profile to a minimum, i.e. to an uncritical amount, so that here again a low-stress condition is obtained during the cooling phase and the calibrating phase in the calibrating tool.

It makes no difference for the mode of operation of the apparatus according to the invention whether the extruder die and the calibrating tool are directly adjoining each other or whether they are located at a mutual spacing from each other.

The invention can be applied basically to a great variety of different cross sections of profiled elements, it being especially suitable for complicated cross sections, e.g. hollow profiles and multiple-chambered hollow profiles of thermoplastic synthetic resins. In case of the thermoplastic synthetic resins, the invention can be utilized with a particularly great advantage where increased tendency toward shrinkage is present due to frozen-in stresses, for example in the extrusion of hard PVC profiled elements.

Figure 4:
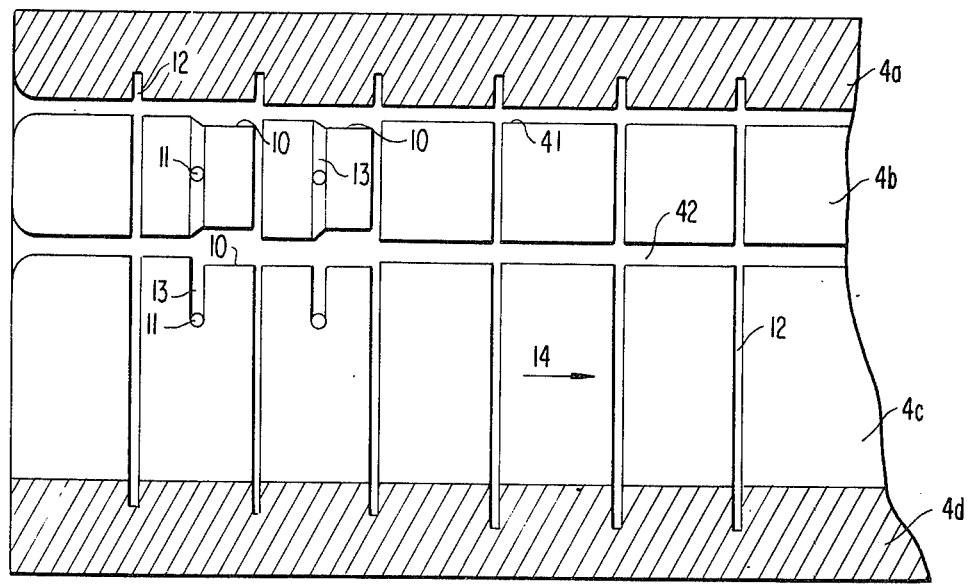
FIG. 4 shows an elevational view of the longitudinal section through the calibrating device of FIG. 3.

Since, during the cooling of the extruded profiled bar while passing through the calibrating tool 4, there always occurs friction of the profiled extrudate on the calibrating wall, due to the influences of the calibrating, and furthermore a certain amount of stretching to compensate for dimensional differences is likewise unavoidable, it is an additional object of the present invention to treat the still hot, extruded profiled bar or element, i.e. the extrudate, entering the calibrating tool 4 so that it can already absorb tensile stresses in the inlet zone of the calibrating tool and thus the frictional resistance of the calibrating wall cannot effect any lengthening of the profiled element. However, with this possibility of avoiding the lengthening of the profiled element, the concomitant stresses are likewise avoided, so that thus also subsequent shrinkage possibilities are correspondingly reduced. For this reason, the invention proposes to effect the cooling of the profiled extrudate very early at individual, defined locations of the periphery of the extrudate in the inlet zone of the calibrating tool. The process of this invention is realized in case of a vacuum calibrating tool with indirect cooling of the latter, for example in connection with the production of a multiple-chamber hollow profiled element as shown in FIGS. 3 and 4. The vacuum calibrating tool 4 is made up, in accordance with the cross section of the extruded element 7, of several tool parts 4'a, 4'b, 4'c and 4'd. In the tool parts 4b and 4c, an indirect cooling system is provided in a meander shape 5a, 5b with water as the cooling medium. The extruded profiled bar 7 has the hollow chambers 7a, 7b, 7c, and 7d, and is moreover provided with projecting profile lugs 71, 72 in the longitudinal direction.

The calibrating tool 4, shown in a longitudinal elevational section in FIG. 4, has the radial vacuum slots 12. In the axial longitudinal direction, the grooves 41, 42 are worked into the calibrating wall in correspondence with the profile lugs 71, 72 of the profiled extrudate 7. The invention is realized by the feature that, in the inlet zone of the calibrating tool, the arrow 14 indicating the passage or travel direction of the extrudate, cooling pockets 10 are milled between the vacuum slots 12 and adjacent the lateral grooves 41, 42. These cooling pockets 10 are in communication, via the radial duct 13, with the meander-shaped ducts 5a, 5b of the indirect caliber cooling system by means of additional bores 11. The cooling water can thus flow from the indirect caliber cooling system 5a, 5b through the connecting bores 11 via the ducts 13 into the cooling pockets 10 and there comes into direct contact with the hot extruded profiled bar 7 at definite points, in the illustrated example in the zone of the profiled webs 71, 72. The heat removal is very intensive at these locations of the profiled extrudate where the cooling pockets 10 are located, and is substantially greater than at the remaining locations of the periphery of this profiled cross section, where merely an indirect cooling is effected through the calibrating wall. The cooling water heated in the cooling pockets is constantly discharged by suction through the vacuum slots 12, with which the cooling pockets are likewise unilaterally in communication. Consequently, new water can subsequently be supplied constantly from the cooling system of the calibrating device. It is advantageous to arrange the cooling pockets so that the cooling water flows through in the travel direction 14 and is removed by suction through the vacuum slots at the end of the passage through the cooling pockets. The suction removal of the warmed-up cooling water through the vacuum slots 12, moreover, also has a favorable effect on the indirect caliber cooling process since it here, too, increases the heat removal and leads to a renewed supply of cold cooling water. By the controlled arrangement of intensive cooling points of the hot profiled extrudate at the inlet zone of the calibrating tool, the hot profiled extrudate has imparted thereto at these locations practically an initial, reinforcing corset, wherein these reinforcements, in contrast to the regions of the profiles which have not as yet been cooled to such an extent, are capable of absorbing tensile forces. Such tensile forces are produced automatically during the passing and drawing of the profiled bar or element through the calibrating device, due to friction of the profile along the calibrating wall. Since these regions can, however, absorb these tensile forces on account of their preceding reinforcement, a stretching of the remaining portions of the profiled element is prevented.

The process and apparatus of the present invention thus make it possible to manufacture profiles, i.e. profiled elements, with a minimum of shrinkage from thermoplastic synthetic resins by extrusion and subsequent calibration with predeterminable article dimensions.

As a processing example with a molding composition on the basis of hard PVC the following batch is employed:

100—parts of suspension PVC with a K-value of 68
10—parts of impact strength modifier
4—parts of barium-cadmium stabilizer combination
1—part of lubricant
3—parts of pigments The extrusion temperature ranges, upon extrusion from the extruder, between 190° and 200° C. preferably around 198° C. The maximum extrusion pressure ranges between 180 and 300 atmospheres gauge, preferably 240 atmospheres gauge. The extrusion speed is 80–120 kg. per hour, depending on the profile cross section. In case of profile cross-section weight 1.5 kg. per meter, this corresponds, for example, to 90 kg., per hour of extrusion, i.e. an extrusion rate (speed) of 60 meters per hour.

The dimensions of the slot of the nozzle outlet die are maintained in height with end wall thickness respectively by 5% smaller than the finished dimensions. This means, for example, according to FIG. 3 that with a wall thickness of 3 mm the nozzle outlet slot is 2.7 mm; with a maximum width of 72 mm finished dimensions, the width of the slot at the nozzle outlet is 68.4 mm, and with a height 60 mm the nozzle has a dimension of 57 mm at the outlet (see FIG. 3 in this connection).

In the calibrating tool the coolant is circulated so that approximately 30° C. is reached in the wall zone in case of indirect cooling, whereas with direct contact a cooling temperature of 10°–15° C. is attained.

The vacuum slots are distributed over the entire length of the caliber and arranged perpendicularly to the extrusion direction at a spacing of for example, 20 millimeters along the entire circumference.

For the practical application of the invention all thermoplastic extrusible plastics can be utilized, i.e., in addition to the hard PVC mentioned in the example, also, soft PVC, or polyethylene, polypropylene, acrylonitrile-butadiene-styrene polymers.

The so-called "corset" can comprise between 10 and 50% of the circumference of a profile; this depends in each case on the profile cross section to be extruded.

The dimensioning of the nozzle exit die and the reduction of the dimensions depend on the so-called swelling behavior of the synthetic resin to be extruded upon exiting from the nozzle.

What is claimed is:

1. A process for reducing the shrinkage of profiled elements of thermoplastic synthetic resins, which shrinkage is produced by undesired stresses frozen in during extrusion in an extruder die and calibration in a calibrating device, which comprises maintaining the extrusion speed of the profiled element upon exiting from an extruder die at approximately the same speed as the calibrating speed and take-off speed of the profiled element during its subsequent passage through a calibrating device and cooling the extruded profiled element in the inlet phase of the calibration in said calibration device at defined locations distributed over the periphery of the cross section of the element to a greater extent than at the remaining locations of the periphery, whereby a reinforcing corset is produced which absorbs the tensile forces during the subsequent further drawing of the element through the calibrating device, the exit cross section of the extruder die being so dimensioned that the profiled element is extruded with cross-sectional dimensions that correspond approximately to those of the calibrated element exiting from the calibrating device.

2. The process according to claim 1, wherein the extruded profiled element, in the initial phase of the calibration operation is cooled externally in a manner distributed along the periphery partially indirectly and partially directly by means of a cooling medium.

3. The process according to claim 2, wherein the cooling medium is water.

* * * * *